United States Patent
Young et al.

(10) Patent No.: US 11,102,655 B1
(45) Date of Patent: Aug. 24, 2021

(54) SECURE DEVICE ACTION INITIATION USING A REMOTE DEVICE

(71) Applicant: Bose Corporation, Framingham, MA (US)

(72) Inventors: Douglas Warren Young, Arlington, MA (US); Niall Tone Kavanagh, Sharon, MA (US)

(73) Assignee: Bose Corporation, Framingham, MA (US)

( * ) Notice: Subject to any disclaimer, the term of this patent is extended or adjusted under 35 U.S.C. 154(b) by 0 days.

(21) Appl. No.: 16/835,864

(22) Filed: Mar. 31, 2020

(51) Int. Cl.
| | |
|---|---|
| *H04W 12/00* | (2021.01) |
| *H04W 12/50* | (2021.01) |
| *H04W 12/06* | (2021.01) |
| *H04R 5/033* | (2006.01) |
| *H04W 4/80* | (2018.01) |
| *H04W 84/20* | (2009.01) |
| *H04R 1/10* | (2006.01) |
| *H04L 9/32* | (2006.01) |
| *H04W 12/03* | (2021.01) |

(52) U.S. Cl.
CPC ........... *H04W 12/50* (2021.01); *H04L 9/3271* (2013.01); *H04R 1/1016* (2013.01); *H04R 5/033* (2013.01); *H04W 4/80* (2018.02); *H04W 12/03* (2021.01); *H04W 12/06* (2013.01); *H04W 84/20* (2013.01)

(58) Field of Classification Search
CPC . H04W 12/001; H04W 12/003; H04W 12/06; H04W 4/80; H04W 84/20; H04L 9/3271; H04R 1/1016; H04R 5/033
USPC ....................................................... 455/411
See application file for complete search history.

(56) References Cited

U.S. PATENT DOCUMENTS

| | | | |
|---|---|---|---|
| 7,742,740 B2 | 6/2010 | Goldberg et al. | |
| 7,865,137 B2 | 1/2011 | Goldberg et al. | |
| 7,916,877 B2 | 3/2011 | Goldberg et al. | |
| 7,917,082 B2 | 3/2011 | Goldberg et al. | |
| 8,023,663 B2 | 9/2011 | Goldberg | |

(Continued)

FOREIGN PATENT DOCUMENTS

| | | |
|---|---|---|
| EP | 2645665 | 10/2013 |
| GB | 2382952 A | 6/2003 |
| GB | 2494550 | 3/2013 |

OTHER PUBLICATIONS

Argenox; A BLE Advertising Primer; Argenox Technologies LLC; 2016; Website available at: http://www.argenox.com/a-ble-advertising-primer/.

(Continued)

*Primary Examiner* — Joel Ajayi

(57) ABSTRACT

Methods and systems for secure device action initiation using a remote device are described herein. The techniques described herein enable, among other actions, users to send a play chirp request to a lost or misplaced device, such as to one or both buds of a truly wireless earbud set. In the case of truly wireless earbuds, a shared secret known by both of the buds can be used to securely initiate the action over an unencrypted link (e.g., an unencrypted BLE link). This can be achieved by using the shared secret to sign an authentication challenge to prove that a remote device that also has access to the shared secret is authorized to initiate the action, thereby providing a secure process. In some implementations, the shared secret is an Identity Resolving Key (IRK), which may be randomly generated by the buds.

19 Claims, 4 Drawing Sheets

(56) References Cited

U.S. PATENT DOCUMENTS

| | | | |
|---|---|---|---|
| 8,170,486 B2 | 5/2012 | Olofsson | |
| 8,391,792 B2 | 3/2013 | Glezerman et al. | |
| 8,433,243 B2 | 4/2013 | Sharma | |
| 8,706,038 B2 | 4/2014 | Sharma | |
| 8,768,252 B2 | 7/2014 | Watson et al. | |
| 8,923,747 B2 | 12/2014 | Tan et al. | |
| 9,191,988 B2 | 11/2015 | Newham | |
| 9,544,689 B2 | 1/2017 | Fisher et al. | |
| 9,756,461 B1 | 9/2017 | Hu et al. | |
| 9,801,059 B2 | 10/2017 | Ziv et al. | |
| 9,820,323 B1 | 11/2017 | Young et al. | |
| 2009/0154739 A1 | 6/2009 | Zellner | |
| 2009/0222910 A1* | 9/2009 | Le Bihan | G06F 21/57 726/19 |
| 2009/0238375 A1 | 9/2009 | Pilati et al. | |
| 2010/0284389 A1 | 11/2010 | Ramsay et al. | |
| 2012/0087503 A1 | 4/2012 | Watson et al. | |
| 2013/0259230 A1 | 10/2013 | Polo et al. | |
| 2013/0279715 A1 | 10/2013 | Tan | |
| 2014/0105396 A1 | 4/2014 | Engelien-Lopes | |
| 2015/0350865 A1 | 12/2015 | Conn et al. | |
| 2016/0073347 A1 | 3/2016 | Michaud et al. | |
| 2016/0095047 A1 | 3/2016 | Lee et al. | |
| 2016/0157078 A1 | 6/2016 | Palin et al. | |
| 2017/0083284 A1 | 3/2017 | Fisher et al. | |
| 2017/0372600 A1 | 12/2017 | Palin et al. | |
| 2018/0172664 A1 | 6/2018 | Love et al. | |
| 2018/0198752 A1 | 7/2018 | Zhang et al. | |
| 2019/0108324 A1 | 4/2019 | Graube et al. | |
| 2019/0356485 A1 | 11/2019 | Young et al. | |
| 2019/0373469 A1 | 12/2019 | Bradley et al. | |

OTHER PUBLICATIONS

KBA_BT_0201: Bluetooth advertising data basics; Silicon Laboratories; Feb. 10, 2017; Website available at https://www.silabs.com/community/wireless/bluetooth/knowledge-base.entry.html/2017/02/10/bluetooth_advertisin-hGsf.

Abraham; Understanding Bluetooth Advertising Packets; June 4.2017; Website available at: http://j2abro.blogspot.com/2014/06/understanding-bluetooth-advertising.html?m=1.

Warne; Bluetooth Low Energy—It starts with Advertising; Feb. 15, 2017; Website available at: https://blog.bluetooth.com/bluetooth-low-energy-it-starts-with-advertising.

Lindh; Bluetooth® low energy Beacons; Texas Instruments Application Report; Jan. 2015; Available at: http://www.ti.com/lit/an/swra475a/swra475a.pdf.

International Search Report and the Written Opinion of the International Searching Authority, International Application No. PCT/US2019/029915, pp. 1-17, dated Jun. 17, 2019.

\* cited by examiner

SECURE DEVICE ACTION INITIATION USING A REMOTE DEVICE

BACKGROUND

This disclosure relates to securely initiating an action using a remote device, such as activating an action for a wearable audio device using a smartphone.

SUMMARY

All examples and features mentioned below can be combined in any technically possible way.

Examples may include one of the following features, or any combination thereof.

In one or more aspects, a method for securely initiating an action on a device is described, where the device includes physically separate components that share a secret. In some such aspects, the method includes: scanning for one or more of the components of the device using the shared secret; establishing a wireless connection to a component of the device; transmitting an action request to the component of the device; receiving an authentication challenge from the component of the device; and transmitting a response to the component of the device, the response determined using the challenge and the shared secret, wherein the action is initiated at a component of the device after the response has been successfully authenticated.

In other such aspects, the method includes: establishing a wireless connection with a remote device; receiving an action request from the remote device; transmitting an authentication challenge to the remote device; and receiving a response from the remote device, the response determined using the challenge and the shared secret, wherein the action is initiated at a component of the device after the response has been successfully authenticated.

In one or more other aspects, a system is described. The system includes: a device including physically separate components, wherein the physically separate components share a secret; a remote device including at least one processor and memory. In some such aspects, the memory includes instructions that when executed securely initiate an action using the device, the instructions including scanning for one or more of the components of the device using the shared secret, establishing a wireless connection to a component of the device, transmitting an action request to the component of the device, receiving an authentication challenge from the component of the device, and transmitting a response to the component of the device, the response determined using the challenge and the shared secret, wherein the action is initiated at a component of the device after the response has been successfully authenticated. In other such aspects, the memory includes instructions that when executed securely initiate an action using the device, the instructions including establishing a wireless connection with a remote device, receiving an action request from the remote device, transmitting an authentication challenge to the remote device, and receiving a response from the remote device, the response determined using the challenge and the shared secret, wherein the action is initiated at a component of the device after the response has been successfully authenticated.

In some examples, the shared secret is an identity resolving key (IRK).

In some such examples, the IRK is randomly generated by the device.

In some examples, the authentication challenge includes a nonce and the response is determined using the nonce.

In some examples, the device is a wearable audio device and the physically separate components each include at least one electro-acoustic transducer.

In some examples, the action causes a chirp to be played at the component of the device.

In some examples, the action causes the component of the device to enter a pairing mode.

In some examples, the action causes the component of the device to advertise one or more capabilities that were not previously advertised.

In some examples, the method or system further includes receiving feedback from the component of the device indicating that the action has been performed.

In some examples, the method or system further includes, prior to transmitting the response, receiving the shared secret from i) another component of the device or ii) internet-connected storage.

In some such examples, the internet-connected storage is accessed via a user account associated with the device.

In some examples, the scanning and wireless connection use Bluetooth technology.

In some such examples, the Bluetooth technology is Bluetooth Low Energy technology.

In some examples, a remote device that has not been previously paired to the component of the device performs the method.

In some examples, the device includes a pair of truly wireless earbuds.

In some such examples, the pair of truly wireless earbuds have a master and slave relationship such that the master wireless earbud controls at least one function of the slave wireless earbud.

In some such examples, the component of the device is the slave wireless earbud.

In some examples, the wireless connection to the component of the device is unencrypted.

In some examples, the action is initiated only at the component of the device and not at other components of the device after the response has been transmitted.

In some examples, the action is initiated at the component of the device directly after the transmission of the response.

In some examples, the method or system further includes receiving a public component of an asymmetric public and private key pair.

DETAILED DESCRIPTION

Figure 1:
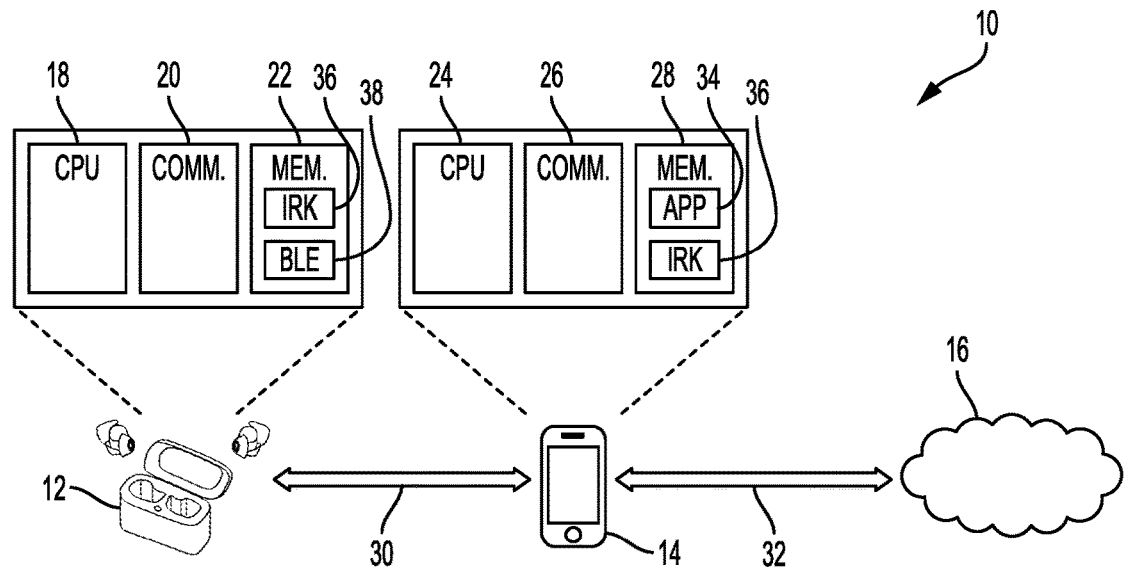
FIG. 1 schematically illustrates a system for resolving the identity of an audio device using an application installed on a remote device according to one example disclosed herein.

Secure device action initiation from a remote device is desired for at least some electronic devices. For instance, in the case of devices including multiple components, such as truly wireless earbuds (where the left and right buds are not physically connected to each other), users may wish to securely initiate actions on the buds from a remote device, such as from a smartphone, tablet, or computer. By way of example, such an action may include a feature to help locate one or both of a pair of lost buds and/or the case that carries the buds. Such a feature to find lost buds is difficult, as it presents privacy and security challenges. For instance, the remote device would need a unique identifier to identify a specific bud or pair of buds in range, and then the find-lost-buds functionality could, e.g., send a chirp command to the bud(s) trying to be found to cause the bud to play a sound loud enough for a user to locate the bud(s). However, for privacy reasons it is undesirable to be able to track the location of a specific pair of earbuds. Further, from a security perspective, it is desired that only trusted devices (e.g., a smartphone owned by the user) can activate the find-lost-buds functionality, especially due to the loud sound (e.g., chirp) that is played to help locate the device. In addition, convenience is a factor for such a feature, as it is undesirable to have to pair both of the truly wireless earbuds to the remote device. Further, it may be desirable for the find-lost-buds functionality to work even when using a remote device that has never been paired to either of the buds. Again, the find-lost-buds functionality is merely an example to help illustrate the systems and techniques described herein, but the present disclosure can be used to securely and remotely initiate other actions, as will be apparent.

Thus, the present disclosure relates to various methods and systems for securely initiating an action on a device using a remote device. The device on which an action is to be initiated could be an electronic device including multiple components. For instance, the device could be an audio device, such as truly wireless earbuds, which are also referred to as truly wireless in-ear (TWIE) headphones or buds. An example of truly wireless earbuds is the SoundSport® Free wireless headphones sold by Bose Corporation. The techniques described herein could also be used to initiate actions for a system having multiple component devices, such as a system of connected audio devices (e.g., as a system of connected headphones or speakers). In some implementations, the components of the device or system are configured to wirelessly connect with one another. For instance, this is the situation with the SoundSport® Free wireless headphones, where the left bud connects to the right bud. In some implementations, both of the truly wireless buds connect to the remote device (e.g., smartphone), such as for Bluetooth Low Energy (LE) Audio implementations. In some implementations, one or both of the truly wireless buds connect with the case that houses and/or charges the buds. The present disclosure primarily discusses the techniques of securely and remotely initiating an action on a device in the context of truly wireless earbuds, or simply, buds, for ease of description; however, the present disclosure is not intended to be so limited unless explicitly stated otherwise.

The techniques described herein enable, among other actions, users to send a sound (such as a chirp sound) to a lost or misplaced device, such as to one or both buds of a truly wireless earbud set. In the example of sending a sound or chirp to a truly wireless earbud(s), the functionality is achieved by connecting to the buds over a wireless protocol, such as Bluetooth, and sending a proprietary command to one or both of the earbuds so they play a loud tone. Bluetooth pairing could be used to securely initiate the action of chirping the buds, so that an unauthorized third party cannot chirp the buds. However, only using Bluetooth pairing to secure the chirp function requires additional pairing steps that make the onboarding experience more cumbersome, as both buds would have to be Bluetooth paired to a remote device (such as a smartphone), which may not otherwise be required when setting up the device and would then diminish the onboarding experience. In addition, if the user did not have their previously paired remote device available but wanted to chirp the buds, they would be unable to do that with another remote device, such as a friend or family member's smartphone.

To address such deficiencies, the techniques described herein, in at least some implementations, utilize a shared secret separate from the Bluetooth link key. The shared secret can be used by the remote device and the buds to initiate a chirp command at one or more of the buds over an unencrypted BLE link. This can be achieved by using the shared secret to sign an authentication challenge to prove that the remote device trying to chirp the buds is authorized by the user of the buds (and not by a third party trying to gain unauthorized access to the buds). Further, the shared secret can be provided to a different remote device than the remote device paired to the buds, which allows for a mobile device that hasn't paired previously to the buds to chirp the buds. Such an action could be achieved by using the other remote device to log into a cloud account associated with the buds to obtain the shared secret. Once the shared secret is obtained, such as being downloaded to the other remote device (e.g., using an app that provides access to the cloud account associated with the buds), the other remote device may be used to securely issue the chirp command (or other action) even if a cloud connection is not present. Note that in some implementations, the shared secret remains in the server/cloud and the cloud signs the authentication challenge from the device and then provides the phone with the signed challenge to use as an authentication response. This can provide increased security as the shared secret need not be stored locally on the remote device (e.g., on the smartphone) in some such implementations.

In some implementations, an Identity Resolving Key (IRK), which is randomly generated by the device (e.g., by the buds), is used as the shared secret. This helps increase privacy and security, as the shared secret originates with the device on which an action is to be initiated. For instance, the IRK could be shared between two truly wireless earbuds (e.g., via Bluetooth radios) and a related charging case (e.g., via a Bluetooth radio). After the user has logged into a related mobile application on a remote device, such as a smartphone, the remote device can obtain a copy of the IRK which it can use to identify all three components of truly wireless earbuds—the left bud, the right bud, and the case—by performing an authentication sequence with only one of those three components. Thus, even if the remote device has not completed an authentication sequence with the other two components, the shared secret (which in this specific example is an IRK) can be known for all of the components, as all of the components share the same shared secret. This also allows a different remote device to obtain the shared secret for all of the components, even where the different remote device has never been paired (e.g., Bluetooth paired) with any of the components, as the shared secret could be associated with a user's cloud account, for example. Thus, the techniques described herein present multiple ways of securely and remotely initiating one or more actions on a user's device, such as on one or more of a user's earbuds and/or the case that houses the earbuds (e.g., a charging case). In some implementations, the shared secret is a public or private key used during an authentication process for the device.

Numerous benefits of the techniques and systems described herein will be apparent in light of this disclosure. For instance, the techniques described herein allow a user to securely initiate an action on their device from any mobile device (e.g., from any smartphone), without additional onboarding steps and without compromising user privacy. The action could include causing a sound or chirp to be played by the device or a component of the device. Such an action could help a user locate the device if lost. The action could include causing the device or a component of the device to enter a pairing mode, such as a Bluetooth pairing mode. Such an action could facilitate pairing components of a device to a remote device, such as assisting with an automatic pairing of a slave bud and/or a case of truly wireless earbuds to a smartphone after the master bud has been paired to the smartphone. The action could include causing the device or a component of the device to advertise one or more capabilities that were not previously advertised. Such an action could help a remote device gain additional information about the device or component that otherwise wouldn't have been known.

When applying the techniques described herein for truly wireless earbuds or another device that utilizes a case (e.g., headphones or glasses), if the buds (or device) are in the case, then the case could perform one or more of the processes described herein, such as advertising on behalf of the buds (or device). After the initial wireless connection is established with the remote device, the case could either wake up the buds (or device) to perform the processes described herein, or the case could act as a pass through for the buds (or device). Numerous variations and configurations will be apparent in light of this disclosure.

FIG. 1 depicts an audio system 10 that includes an audio device 12 and a remote device 14 for providing audio data to the audio device 12 and/or controlling certain operations of the audio device 12. The audio device 12 may be or include truly wireless earbuds (e.g., as shown in FIG. 1), headphones, a headset, earpieces, ear hooks (e.g., that hook on the top of a user's ears), speakers, glasses, modules to be included in a wearable device (e.g., modules that attach to glasses or a headband), or any other device configured to produce sound from audio data. The remote device 14 may be or include any wireless-enabled audio source capable of transmitting audio data, such as a smartphone (as shown in FIG. 1), tablet, laptop, etc. The system 10 may also include a server 16, e.g., a network-, internet-, or cloud-based server, configured to facilitate secure transactions between the audio device 12 and the remote device 14, as discussed in more detail herein.

The audio device 12 may include a processor or CPU 18, a communication module 20, and a memory module 22, while the remote device 14 may include a processor or CPU 24, a communication module 26, and a memory module 28. It is to be appreciated that the server 16 may additionally include any combination of these or other computing resources (e.g., cloud-based computing resources). The processors 18 and 24 may each take any suitable form, such as a microcontroller, plural microcontrollers, circuitry, a single processor, or plural processors configured to execute software instructions.

The communication modules 20 and 26 are configured to establish a wireless connection 30 between the audio device 12 and the remote device 14. The communication modules 20 and 26 may be any module, device, transceiver, radio, or means capable of enabling the transmission and/or reception of a wireless communication signal. In one example, the communication modules 20 and 26 each include a radio frequency antenna coupled with a Bluetooth chipset. The communication module 26 is additionally configured to establish a data connection 32 with the server 16, and may utilize any wired or wireless technology (or combinations thereof), including but not limited to Wi-Fi (e.g., IEEE 802.11), Bluetooth, cellular, Ethernet, etc. For example, the data connection 32 may be established over the internet using any number of network devices or infrastructure.

The memory modules 22 and 28 may each take any suitable form or forms, including volatile memory, such as random access memory (RAM), or non-volatile memory such as read only memory (ROM), flash memory, a hard disk drive (HDD), a solid state drive (SSD), or other data storage media. The memory modules 22 and 28 may be used by the processors 18 and 24, respectively, for the temporary storage of data during their operation. Data and software, such as the algorithms or software necessary to perform the methods and provide the functionality discussed herein, as well as an operating system, firmware, or other application, may be installed in the memory modules 22 and 28.

The remote device 14 includes an application 34 stored in the memory module 28 that facilitates and/or controls connection with, transmission to, and/or control of the audio device 12. In one example, the application 34 includes the Bose® Connect application. The wireless connection 30 may include multiple connections, e.g., over different channels or according to different protocols. In one example, the wireless connection includes an application layer connection for the application 34 to the audio device 12. For example, the connection 30 may include a classic Bluetooth connection between the audio device 12 and the remote device 14, as well as a BLE connection that utilizes mobile application part (MAP) protocols. Since the application 34 is installed on the remote device 14, it is to be appreciated that functionality, operational steps, etc. attributed to the remote device 14 may generally include use of the application 34, and that functionality, operational steps, etc., attributed to the application 34 may be carried out by physical components of the remote device 14. For example, the various different protocols, channels, technologies, etc. used by the connection 30 may all be initiated by the application 34 and/or established by the same physical layer components, e.g., the communication module 26.

The audio device 12 is associated with a corresponding identity resolving key (IRK) 36 (or "product IRK 36"). The identity resolving key 36 may include any string of characters that can be used to generate and resolve a random resolvable address according to any encryption technique or methodology, such as Advanced Encryption Standard (AES). In one example, the product IRK 36 is a 128-bit key intended for use with AES-128. The product IRK 36 may be obtained by the application 34 for storage in the memory module 22 in any desired manner. For example, in one example, the audio device 12 is configured to generate the product IRK 36, e.g., using the processor 18 and a corresponding algorithm stored in the memory module 22. For instance, a symmetric algorithm could be used to generate the signed payload, such as a symmetric SHA256-HMAC algorithm. Generation of the product IRK 36 may occur, for example, at first-time boot-up or factory reset, after which the product IRK 36 is saved in non-volatile storage in the memory module 22. In another example, the audio device 12 is configured to request the product IRK 36 from the server 16, e.g., utilizing the remote device 14 as a relay, as discussed in more detail herein. The product IRK 36 may alternatively be generated and assigned to the audio device 12 by manufacturing equipment during the manufacturing process for the audio device 12.

The audio device 12 is configured to use the product IRK 36 to generate (e.g., with the processor 18) a corresponding random resolvable address for the audio device 12. In accordance with examples discussed in more detail below, the random resolvable address for the audio device 34 may be stored in the memory module 22, such as in the payload of an advertising packet 38 or other publicly broadcast data. As also discussed in more detail below, the audio device 12 is configured to transmit the product IRK 36 to the application 34 so that the application 34 can later identify whether it has previously connected to the audio device 12.

Figure 2:
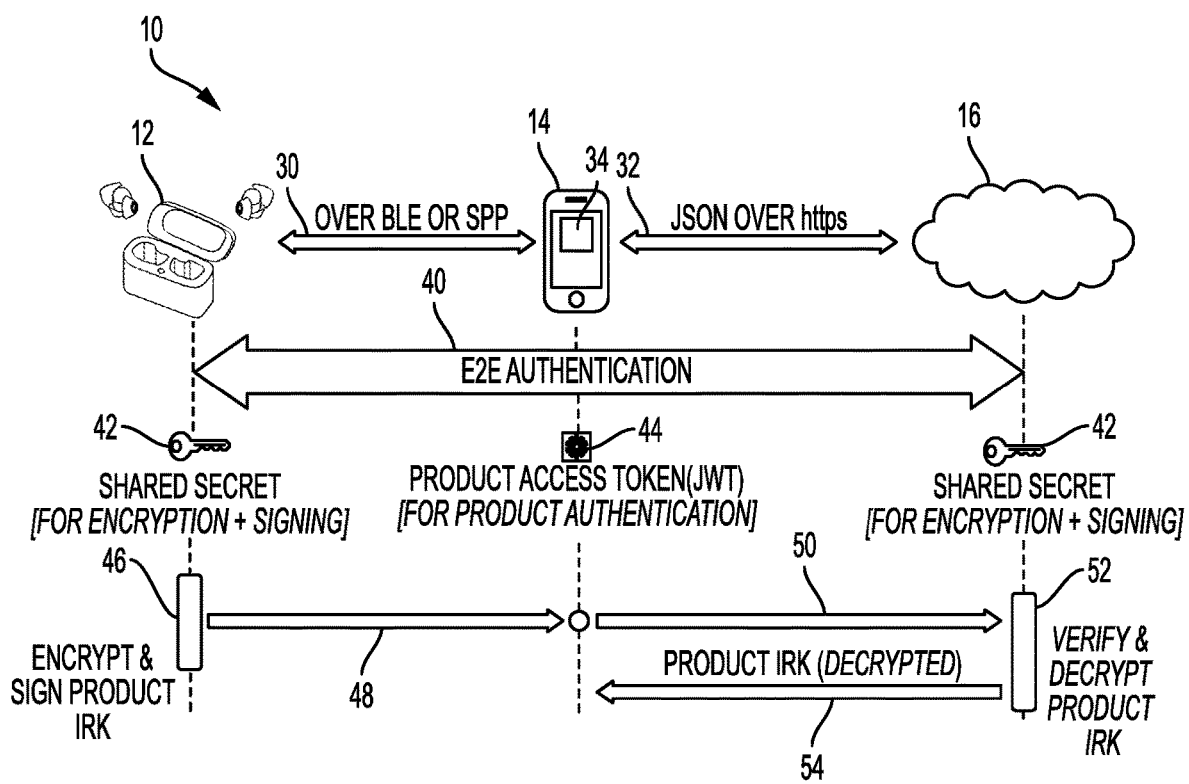
FIG. 2 illustrates a flow chart for securely transmitting an identity resolving key from an audio device to an application of a remote device according to one example disclosed herein.

If the audio device 12 and the remote device 14 are securely paired together, e.g., via Bluetooth Low Energy (BLE) specifications, the application 34 may transfer the product IRK 36 directly over the connection 30. However, if increased security is desired, the server 16 may be utilized. One method of using the server 16 to provide increased security while transmitting the product IRK 36 from the application 34 to the audio device 12 is illustrated in FIG. 2. In this example, the wireless connection 30 may include an application layer connection established by the application 34 via any applicable protocol over a BLE and/or Serial Port Profile (SPP) connection, while the data connection 32 may be established via JavaScript Object Notation (JSON) over a secure hypertext transfer protocol (HTTPS). Those of ordinary skill in the art will recognize other protocols, standards, specifications, and/or technology that may be used to establish and/or transfer data over the connections 30 and 32.

In the example of FIG. 2, it is assumed that the server 16 is an authentication server, e.g., owned or operated by the manufacturer of the audio device 12. In this way, when the application 34 first connects to the audio device 12, the audio device 12 can be authenticated as genuine by the server 16 via an end-to-end (E2E) authentication process 40. Authentication may be accomplished using pre-established unique identifier for the audio device 12, such as a globally unique identity (GUID), as well as public and private key pairs, which are known to the server 16 and the audio device 12. For example, the GUID and key pair may be generated as part of the manufacturing process for the audio device 12 and distributed to the server 16 and the audio device 12.

As part of the E2E authentication process 40, the server 16 may complete handshaking according to a pre-established process (e.g., using the GUID and key pair, as noted above) that results in the exchange of a shared secret 42 with the audio device 12. For example, the shared secret 42 may be an encryption key that enables communications between the audio device 12 and the server 16 to be securely encrypted, decrypted, and/or signed. Since the communications are encrypted by the shared secret 42, which is securely known by the audio device 12 and the server 16, the remote device 14 can be securely used as a relay to transfer encrypted communications. As an additional step, the user may be required to enter user credentials to the server 16, such as a username and password, in order to authorize the remote device 14 and/or the application 34 to act as a relay. This may generate an access token 44 that is returned to the application 34, e.g., a JSON Web Token if JSON is employed for the data connection 32, and which may be used for future authentications.

At step 46 in FIG. 2, the audio device 12 encrypts and/or signs the product IRK 36, e.g., using the shared secret 42 negotiated in the E2E authentication process 40. At step 48, the encrypted version of the product IRK 36 is sent to the application 34. The application 34 may then forward the encrypted product IRK 36 to the server 16 with a request to verify and decrypt the IRK 36 at step 50. At step 52, the encrypted product IRK 36 is decrypted and/or the signature is verified, e.g., using the shared secret 42. At step 54, the product IRK 36 (in decrypted state) is sent to the application 34. It is noted that even though the product IRK 36 is sent in a decrypted state, the transmission may be made over an encrypted link to maintain security. In one example, the step 54 is only implemented if the user has provided appropriate authenticating credentials to the server 16 (e.g., as discussed above with respect to the access token 44). The decrypted product IRK 36 may then be stored in the memory module 28. The remote device 14 may use the product IRK 36 to generate a random resolvable address for the audio device 12.

The random resolvable address generated by the audio device 12 for itself using the product IRK 36 may be included in data publicly broadcasted by the audio device 12, such as inserted into the BLE advertising packets broadcast by the audio device 12. An example of the BLE advertising packet 38 (stored in the memory module 22 of the audio device 12, as noted above) is illustrated in more detail FIG. 3. The random resolvable address generated using the product IRK 36 may be stored in a publicly accessible field of the advertising packet 38, such as a manufacturer specific data field 56.

Figure 3:
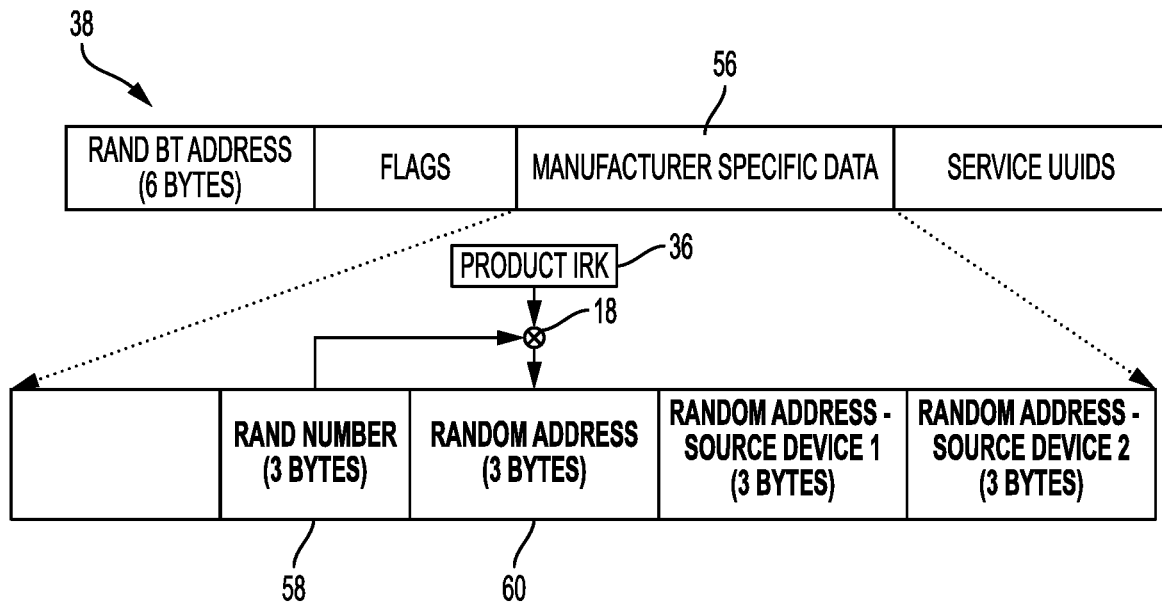
FIG. 3 schematically illustrates an advertising packet and manner of generating a random resolvable address and inserting it into a field of the advertising packet according to one example disclosed herein.

Data entries in the manufacturer specific data field 56 may include a random number 58 and a random resolvable address 60 associated with the audio device 12. In addition to the contents of the advertising packet 38, FIG. 3 schematically illustrates how the audio device 12 may generate the random resolvable address 60 for entry into the data field 56. That is, the generation of the random resolvable addresses 60 may be achieved by retrieving the random number 58 and encrypting the random number 58 with the corresponding product IRK 36, e.g., via the processor 18 of the audio device 12. The random number 58 may be refreshed periodically, e.g., every few minutes, with a new randomly derived number. In this way, the random resolvable address 60 for the audio device 12 may be generated by the audio device 12, stored in the corresponding section of the data field 56, and continuously broadcast with the BLE advertising packet 38. The random resolvable address 60 can correspondingly be updated periodically, e.g., each time the random number 58 is refreshed. As noted above, those of ordinary skill in the art will appreciate other methods for generating a random number and/or random resolvable address.

Figure 4:
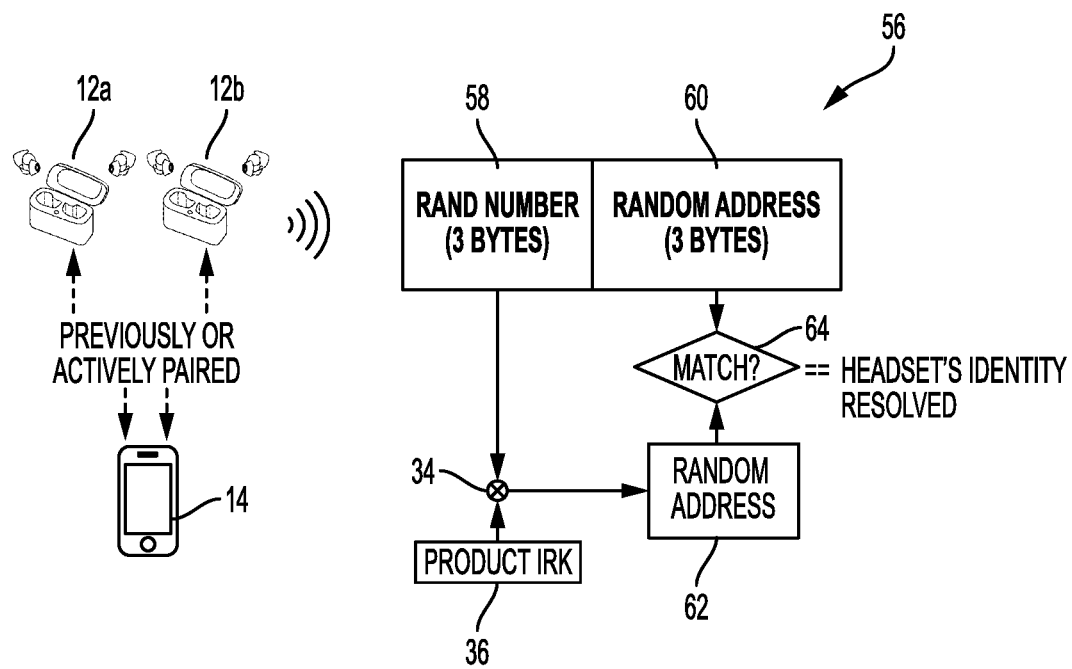
FIG. 4 is a block diagram illustrating a method and system for resolving the identities of audio devices using an application installed on a remote device according to one example disclosed herein.

The random resolvable address 60 may be used by the application 34 to resolve the identity of each audio device within communication range of the remote device 14, whether or not they have been previously paired to the remote device 14 and/or the application 34. As shown in FIG. 4, a first audio device 12a and a second audio device 12b are both in communication with the remote device 14, e.g., the remote device 14 and/or the application 34 are receiving the BLE advertising packets 38 broadcasts by each of the audio devices 12a and 12b. It is noted that a different instance of the product IRK 36 would be stored in memory for each audio device that pairs with the application 34. For example, a first product IRK may be stored in the memory module 28 corresponding to the first audio device 12a and a second product IRK may be stored in the memory module 28 corresponding to the second audio device 12b if both the audio devices 12a and 12b were at some point connected to the remote device 14.

The application 34 may be configured to, for each nearby broadcasting audio device, retrieve the random number 58 from the field 56 of the received BLE advertising packet 38 broadcast from each audio device 12. For example, this may include retrieving a first random number for the first audio device 12a and a second random number for the second audio device 12b. In this way, any number of random numbers can be retrieved for any number of nearby broadcasting audio devices. Using the product IRKs 36 previously stored in the memory 28 (e.g., a first product IRK for the first audio device 12a, a second product IRK for the second audio device 12b, etc.) and the random numbers 58, the application 34 may generate one or more random resolvable address 62 (e.g., using the processor 24). For example, the random resolvable address 62 may include a random resolvable address for each combination of stored product IRK and retrieved random number.

The random resolvable address 60 can be retrieved from the data field 56 of each BLE advertising packet 38 received by the application 34 and compared to each instance of the random resolvable address 62. For each pair of the random resolvable addresses 60 and 62 that match, then the identity of the audio device corresponding to the matching pair of random resolvable addresses is resolved (i.e., the application 34 can determine the identity of the audio device by the product IRK corresponding to the instance of the random resolvable address 62 in the matching pair). If any of the random resolvable addresses 60 do not match one of the random resolvable addresses 62, then the application 34 can determine that the audio device corresponding to each unmatched instance of the random resolvable address 60 has not been previously paired to the application 34. The user interface of the application 34 can be updated to provide the identities of the identified audio devices, as well as to indicate which nearby broadcasting audio devices have not been previously paired with the application 34.

Figure 5:
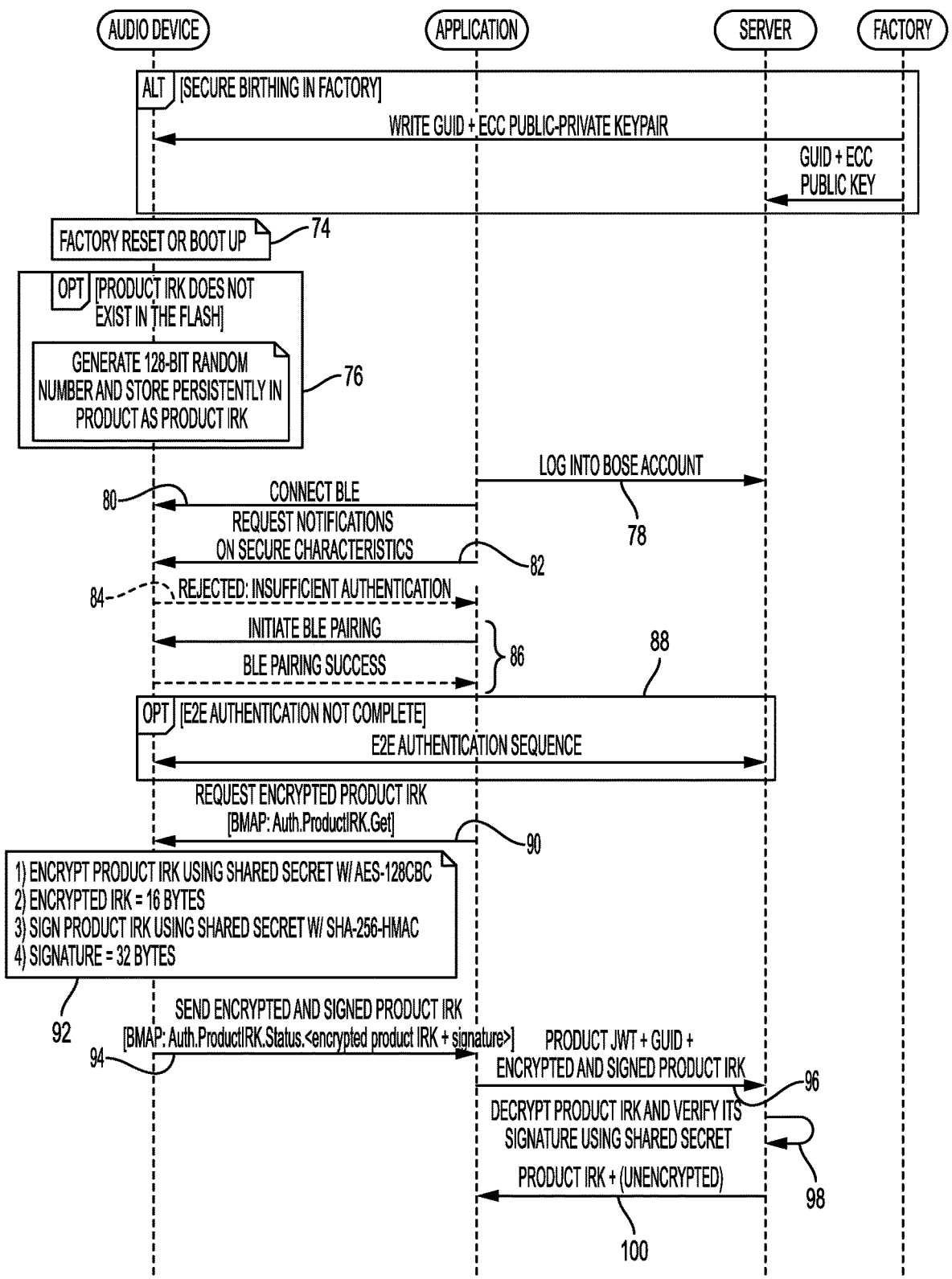
FIG. 5 is a sequence diagram illustrating a method for resolving the identities of audio devices using an application installed on a remote device according to one example disclosed herein.

A sequence diagram describing a method 70 for securely resolving the identity of nearby broadcasting audio devices using an application installed on the remote device is illustrated in FIG. 5. At step 72, one or more audio devices (e.g., the audio devices 12, 12a, 12b) are manufactured, which may include sending a globally unique identity (GUID) and public-private key pair to the corresponding audio device and to an authentication server (e.g., the server 16). The key pair may be generated according to any cryptographic methodology, such as elliptic-curve cryptography (ECC). At step 74, each audio device may undergo a first-time boot-up or factory reset. Step 74 may trigger step 76, in which an identity resolving key for the audio device is generated (e.g., the product IRK 36), e.g., as a 128-bit random number, and/or in any manner described herein.

Note that the sequence of FIG. 5 may be performed using the master bud of a pair of truly wireless earbuds as the audio device.

At step 78, the user of an application (e.g., the application 34) for remotely connecting to and/or controlling the audio device may provide authentication credentials to the authentication server. For example, this may include the user entering a username and password to log into or access an account or user profile managed by the authentication server. The user may also use the application to initiate a connection, e.g., a BLE connection, to the audio device at a step 80 and/or to request notifications over a Generic Attribute Profile (GATT) characteristics requiring encryption at step 82. The audio device may reject the requests at step 84 due to insufficient authorization. Next, the application may initiate a BLE pairing at step 86. If additional authorization is required, an end-to-end authentication sequence (e.g., according to the E2E authentication process 40) may be carried out between the audio device and the server at step 88. The application may be approved as a relay during this process due to providing the credentials in step 78 or may need to resubmit the necessary credentials.

At step 90, the application may request the audio device's IRK, e.g., in encrypted form. The audio device may encrypt and/or sign its IRK at step 92, e.g., using a shared secret (e.g., the shared secret 42) negotiated during the E2E authentication sequence of step 88. The encryption and signature with the shared secret may use AES-128 or any other desired cryptographic technique. The signature may be created in accordance with SHA-256-HMAC or any other desired methodology. The encrypted and/or signed product IRK is then sent to the application at step 94.

At step 96, the encrypted and signed product IRK is forwarded from the application to the authentication server. The step 96 may include sending an access token (e.g., the access token 44) generated by the server for providing requisite credentials, e.g., in the step 78. The access token may be a JSON Web Token (JWT) if JSON is utilized to establish communication between the application and the server. The server decrypts and verifies the product IRK at step 98 and returns it (in unencrypted form) to the application at step 100. As noted with respect to step 54, even though the product IRK is sent in a decrypted state, the transmission may be made over an encrypted link to maintain security, e.g., thereby preventing interception from malicious third parties. The method 70 can be repeated as necessary for any number of different audio devices. Thereafter, e.g., as discussed with respect to FIG. 4, the application is able to in the future resolve the identity of each previously-paired audio device based on the contents of the audio device's BLE advertising packet or other broadcasted data.

It is noted that additional instances of the application can log into the same account (e.g., complete step 78) and be provided with all of the product IRKs for audio devices paired with other instances of the application. In this way, the application on any remote device can identify audio devices in range associated with a particular user's account. Advantageously, the application can reflect in its user interface each audio device in range that was previously-paired to any instance of an application associated with the user's account without including static uniquely identifying information in the audio device's BLE advertising packet (which may compromise a user's privacy by enabling the audio device's location to be tracked over time).

Figure 6:
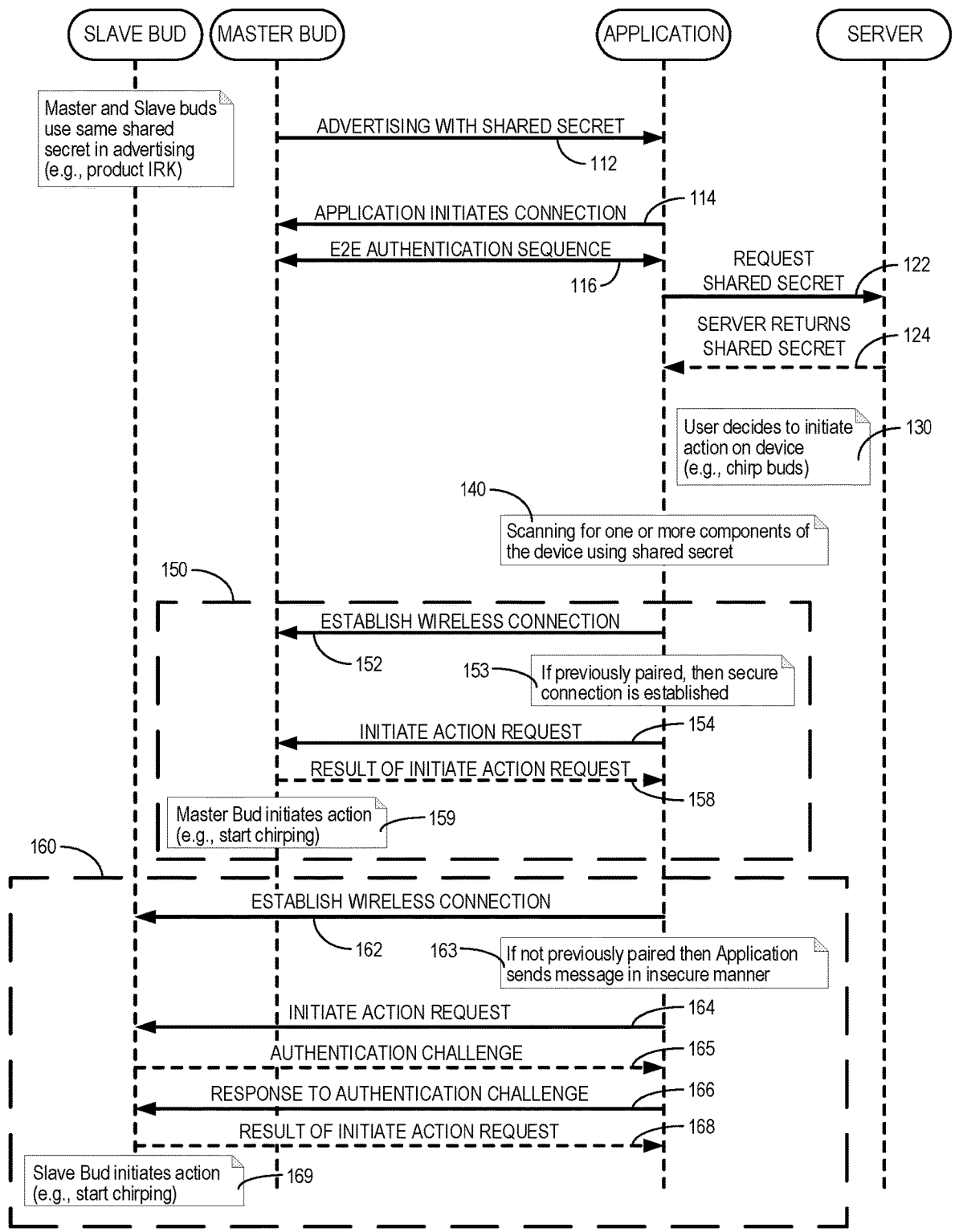
FIG. 6 is a sequence diagram illustrating a method for secure device action initiation from an application of a remote device according to one example disclosed herein.

FIG. 6 is a sequence diagram illustrating a method for secure device action initiation from an application of a remote device. In this example diagram, the device on which the action is to be initiated is a pair of truly wireless earbuds that include a master bud and a slave bud. Note that a master/slave relationship in the context of audio devices, such as truly wireless buds, is used to denote a first device or component, the master, that controls at least one function or aspect of a second device or component, the slave. For example, the master bud may serve as the communication hub for the slave bud, whereby data (e.g., audio data, command data, power management data) from a remote device (e.g., a smartphone) is relayed through the master bud to the slave bud. However, in other implementations, both of the buds have a direct connection to the remote device, such as when utilizing an LE Audio connection or another true wireless scheme where each bud connects directly to the remote device (e.g., smartphone or other computing device). In this example implementation, the device on which an action is securely initiated includes two components (the master and slave buds), but the device could include additional components, such as, e.g., a related case in which the buds matingly engage. In addition, the device on which an action is securely initiated using one or more of the techniques described herein could be any electronic device in some implementations, such as any audio device (e.g., audio device 12 as described herein). Previous relevant description of the application and server (e.g., from FIG. 5) are equally applicable to the sequence diagram of FIG. 6. In this example implementation, the application is executed using a remote device, such as a smartphone, tablet, smart case (e.g., case for the buds that includes a processor and capabilities to perform the techniques described herein), or another suitable device. In addition, in this example implementation, the server could provide access to a cloud account associated with at least one of the user, the application, or the audio device (which includes the master and slave truly wireless buds in this example).

In the implementation of FIG. 6, the master and slave buds use the same shared secret in advertising. In some aspects, the shared secret could be the device or product IRK (e.g., product IRK 36 described herein), where the device is the truly wireless buds that includes at least the components of the master bud and the slave bud. At step 112, the master bud advertises the shared secret to the application of the remote device. The advertising can be achieved using, for example, a BLE advertising packet scheme, where the shared secret (e.g., the product IRK) is included in the BLE advertising packet. In another example, only a representation or a hash of the shared secret (e.g., IRK) is placed in the BLE advertising packet, so as to not expose the shared secret (e.g., IRK) itself. The advertising of step 112 is used to facilitate an E2E authentication process between (i) the device and (ii) the application and/or server. At step 114, the application (e.g., mobile app) initiates a connection, which is used to facilitate 116 the E2E authentication sequence (e.g., E2E authentication process 40 described herein).

Optionally, the sequence can continue with the server requesting 122 the shared secret (e.g., product IRK) from the application, followed by the server or cloud returning 124 the shared secret to the application. However, such an optional process need not occur where, e.g., the shared secret is only maintained locally on the remote device. Where the optional communication of the shared secret with the server occurs, once complete, in some implementations, the application may receive a product token that can be used to request a copy of the product's shared secret from the server.

The sequence of FIG. 6 then continues by scanning 140 for one or more components of the device using the shared secret. If the remote device running the application has been paired with the component (e.g., via Bluetooth pairing), such as is the case with the master bud, then the sequence continues with box 150, as a secure connection can be established in the first instance. If the remote device running the application is not paired with the component (e.g., is not Bluetooth paired), such as is the case with the slave bud, then the sequence continues with box 160, as a secure connection is not established in the first instance. However, as will be apparent, box 160 describes a process that still allows for an action to be initiated on the slave bud in a secure manner. Note that, in general, the process of box 150 can be used for any paired device or device component, while the process of box 160 can be used for any unpaired device or device component.

When a device or device component is paired to the remote device prior to scanning 140 occurs, the pairing (e.g., BLE pairing) may be used to secure communication between the application and the master bud, thereby providing a way for the application to securely send commands to the master bud. This is shown in box 150, as after scanning 140 has initiated, a wireless connection can be established 152 between the application of the remote device and the master bud (or another paired device/component). Again, as the master bud was previously paired to the remote device, the connection is secure, as indicated in 153. This allows for the application to send an initiate action request 154 to the master bud which causes the master bud to initiate the action, as shown at 159. In some implementations, the master bud may optionally send the result 158 of the initiate action request made at 154. For instance, this could include confirmation that the action request has been or will be initiated, or a response stating that the master bud cannot complete the request.

However, for various reasons, a device or device component may not be paired to the remote device running the application prior to scanning 140 occurs. For instance, it is undesirable for a user to have to pair both the master and slave bud to the remote device during setup, as the application of the remote device typically does not utilize a direct connection to the slave bud. Another reason may be that the device or device component (e.g., the master or slave bud) is paired to the remote device (e.g., a user's smartphone), but the application is being used on a different remote device (e.g., a friend or family member's smartphone) to securely initiate an action request. In such situations, the application running on the different remote device could request the shared secret from the server to perform the processes in box 160. As shown in box 160, after scanning 140 is initiated by a user using the application, a wireless connection can be established 162 between the application of the remote device (or different remote device) and the slave bud (or another unpaired device/component). As indicated in 163, the application is not paired to the slave bud, such that the wireless connection established at 162 is an insecure connection. For instance, commands may be sent to the slave bud over an unpaired and/or unencrypted BLE link.

Continuing in box 160, a challenge/response scheme is used between the application and slave bud to provide authentication to initiate an action at the slave bud in a secure manner. This includes the application sending an initiate action request 164 to the slave bud, which prompts the slave bud to send an authentication challenge 165 to the application. In other words, as the initiate action request 164 is sent over an insecure connection, such as an unencrypted link, the application receives an authentication challenge 165, such as an error back from the slave bud which could contain information in the error payload as a part of the challenge/response scheme. The information in the error payload could be, e.g., a random number, such as a nonce (e.g., a 128-bit nonce), that must be signed with the shared secret to authenticate the error. After receiving authentication challenge 165 from the slave bud, the application responds to the authentication challenge 166 to satisfy that challenge with an appropriate response. This can be achieved by using the shared secret in the response 166. Continuing with the previous example, the response 166 could include signing the authentication challenge 165 with the shared secret, such as signing a nonce in the error payload with the shared secret, and sending the response 166 with the signed payload to securely cause an action to be initiated by the slave bud, as shown at 169. In some implementations, the slave bud may optionally send the result 168 of the initiate action request made at 154. For instance, this could include confirmation that the action request has been or will be initiated, or a response stating that the slave bud cannot complete the request.

As can be understood based on the sequence to this point, because both the master bud and the slave bud use the same shared secret, even if the application has never connected to the slave bud, it can utilize the shared secret to identify whether the slave bud is advertising (e.g., over BLE). Further, if a user downloads the application on a different remote device than the one used to perform the E2E authentication sequence 116, so long as the server has obtained the shared secret (e.g., via processes 122 and 124 described above), then the different remote device that has never paired to one or both of the buds can be used to securely initiate an action via process flow 150 or process flow 160. For instance, this can be achieved by previously associating the buds with the user's account via the server (which includes the server obtaining the buds shared secret) such that the user can log into their account on a different remote device (e.g., a friend or family member's smart device) to securely initiate an action at one or both of the buds. For example, the different remote device could be used to chirp one or both of the buds that are in range and are BLE advertising, which can help a user find the bud(s).

An advantage to the approach in box 160 is that it does not require a connection to the server from the application to cause the action to be initiated at the slave bud 169, as long as the application previously received the shared secret, such as from the master bud or from the server (e.g., by previously signing into a cloud account). In some implementations, the slave bud may only be capable of establishing a wireless connection with the application or only advertise (e.g., via BLE) when the slave bud is not connected to the master bud. In such implementations, advertising (e.g., via BLE) from the slave bud has the potential to reduce radio frequency (RF) robustness or performance when music is streaming, and thus, advertising from the slave bud may be avoided when possible. Also, in some implementations, when the master and slave buds are connected, the master bud can forward the initiate action request (e.g., request 154) to the slave bud, so the application need not connect to the slave bud in order to initiate an action from the slave bud (e.g., to cause the slave bud to chirp to assist with locating the slave bud).

Detection of the processes in FIG. 6, such as the processes in box 160, can be detected using, e.g., a Bluetooth airtrace while running through the processes with a pair of truly wireless earbuds. For instance, detection of the processes in box 160 can be detected if the slave bud of the truly wireless earbuds is not paired to the phone during onboarding and a user is able to initiate an action on that slave bud (e.g., initiate chirping from the bud) using a remote device (e.g., a smartphone). An airtrace could be used to determine whether the truly wireless earbuds simply use an insecure design (e.g., they send a hardcoded command over an encrypted BLE link) or whether they use a challenge/response scheme using a shared secret as described herein.

A number of implementations have been described. Nevertheless, it will be understood that additional modifications may be made without departing from the scope of the inventive concepts described herein, and, accordingly, other implementations are within the scope of the following claims.

What is claimed is:

1. A method for securely initiating an action on a wearable audio device, the wearable audio device including components that are physically separate and configured to wirelessly communicate with each other, the components each including at least one electro-acoustic transducer, at least one processor, at least one wireless radio, and memory, the method comprising:
   scanning, at a remote device, for one or more of the components of the wearable audio device using a shared secret known by the one or more components of the wearable audio device;
   establishing, at the remote device, a wireless connection to one of the components of the wearable audio device;
   transmitting, from the remote device, an action request to the one of the components of the wearable audio device;
   receiving, at the remote device, an authentication challenge from the one of the components of the wearable audio device; and
   transmitting, from the remote device, a response to the one of the components of the wearable audio device, the response determined using the authentication challenge and the shared secret, wherein the action is initiated at the one of the components of the wearable audio device after the response has been successfully authenticated,
   wherein the shared secret is i) an identity resolving key (IRK) or ii) a private key used during an authentication process for the wearable audio device,
   wherein the remote device has not been previously paired to the component of the wearable audio device, and
   wherein, prior to the scanning, the shared secret is obtained by the remote device from i) another one of the components of the wearable audio device or ii) internet-connected storage that is associated with the wearable audio device, the internet-connected storage having obtained the shared secret during the authentication process for the wearable audio device.

2. The method of claim 1, wherein the shared secret is an identity resolving key (IRK).

3. The method of claim 2, wherein the IRK is randomly generated by the wearable audio device.

4. The method of claim 1, wherein the authentication challenge includes a nonce and the response is determined using the nonce.

5. The method of claim 1, wherein the shared secret is a private key used during an authentication process for the wearable audio device.

6. The method of claim 1, wherein the action causes a chirp to be played at the one of the components of the wearable audio device.

7. The method of claim 1, wherein the action causes the one of the components of the wearable audio device to enter a pairing mode.

8. The method of claim 1, wherein the action causes the one of the components of the wearable audio device to advertise one or more capabilities that were not previously advertised.

9. The method of claim 1, further comprising receiving, at the remote device, feedback from the one of the components of the wearable audio device indicating that the action has been performed.

10. The method of claim 1, wherein the shared secret is obtained by the remote device from the other one of the components of the wearable audio device.

11. The method of claim 1, wherein the shared secret is obtained from the internet-connected storage, and wherein, prior to the scanning, the internet-connected storage is accessed via a user account associated with the wearable audio device.

12. The method of claim 1, wherein the scanning uses Bluetooth Low Energy (BLE) technology.

13. The method of claim 1, wherein the components of the wearable audio device include a pair of truly wireless earbuds.

14. The method of claim 13, wherein the pair of truly wireless earbuds have a master and slave relationship such that a master wireless earbud controls at least one function of a slave wireless earbud.

15. The method of claim 14, wherein the one of the components of the wearable audio device is the slave wireless earbud.

16. The method of claim 1, wherein the wireless connection to the one of the components of the wearable audio device is unencrypted.

17. The method of claim 1, wherein the action is initiated only at the one of the components of the wearable audio device and not at any other of the components of the wearable audio device after the response has been transmitted.

18. A system comprising:
a wearable audio device including components that are physically separate and configured to wirelessly communicate with each other, the components each including at least one electro-acoustic transducer, at least one processor, at least one wireless radio, and memory, wherein a shared secret is known by the components of the wearable audio device; and
a remote device including at least one processor and memory, the memory including instructions that, when executed, securely initiate an action using the wearable audio device, the instructions comprising
  scanning for one or more of the components of the wearable audio device using the shared secret,
  establishing a wireless connection to one of the components of the wearable audio device,
  transmitting an action request to the one of the components of the wearable audio device,
  receiving an authentication challenge from the one of the components of the wearable audio device, and
  transmitting a response to the one of the components of the wearable audio device, the response determined using the authentication challenge and the shared secret, wherein the action is initiated at the one of the components of the wearable audio device after the response has been successfully authenticated,
wherein the shared secret is i) an identity resolving key (IRK) or ii) a private key used during an authentication process for the wearable audio device,
wherein the remote device has not been previously paired to the component of the wearable audio device, and
wherein, prior to the scanning, the shared secret is obtained by the remote device from i) another one of the components of the wearable audio device or ii) internet-connected storage that is associated with the wearable audio device, the internet-connected storage having obtained the shared secret during the authentication process for the wearable audio device.

19. The system of claim 18, wherein the action causes a chirp to be played at the one of the components of the wearable audio device.

* * * * *